May 19, 1959     D. L. JAFFE     2,887,655
MICROWAVE POWER MONITOR
Filed June 23, 1953     3 Sheets-Sheet 1
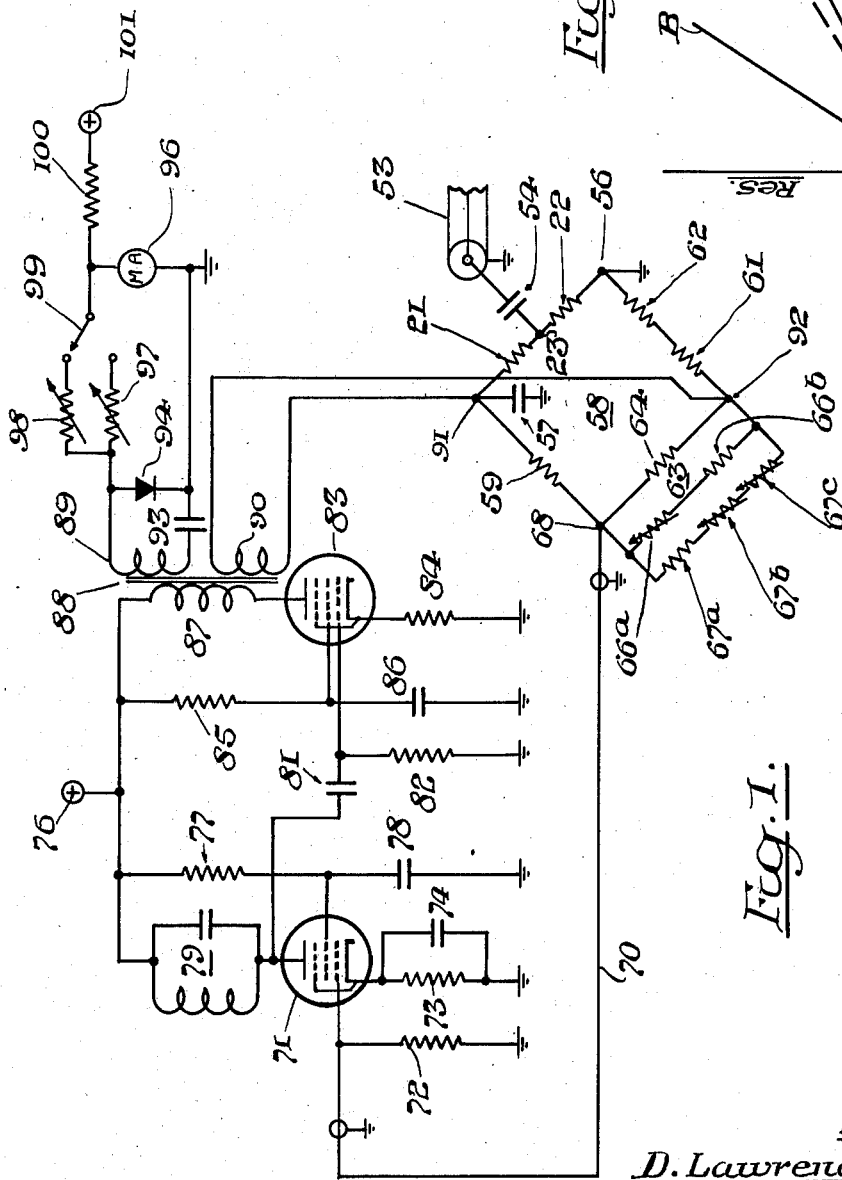
INVENTOR.
D. Lawrence Jaffe
BY Darby & Darby
Attorneys,

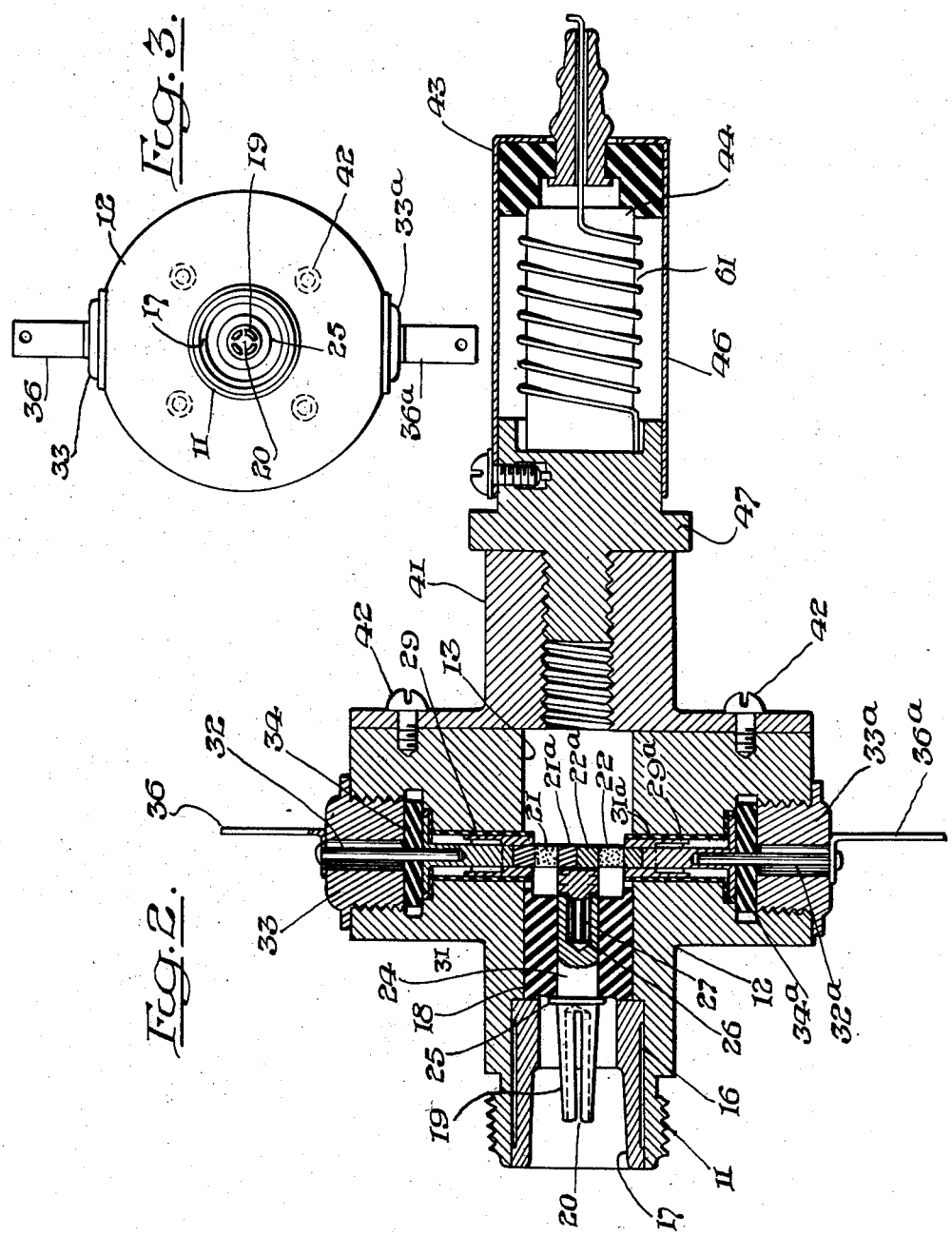

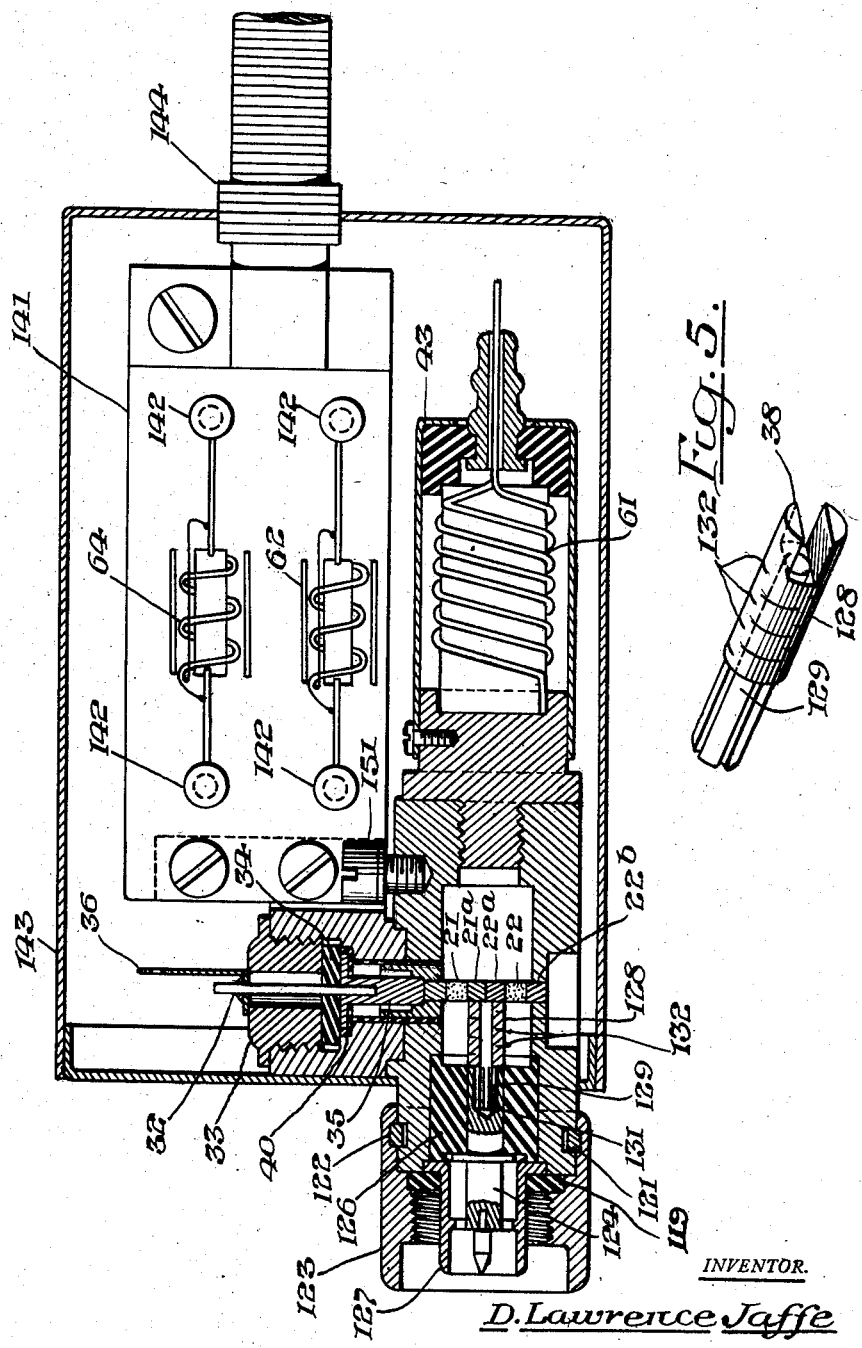

United States Patent Office 2,887,655
Patented May 19, 1959

2,887,655

MICROWAVE POWER MONITOR

D. Lawrence Jaffe, Great Neck, N.Y., assignor to Polarad Electronics Corporation, Brooklyn, N.Y., a corporation of New York Application June 23, 1953, Serial No. 363,627

5 Claims. (Cl. 324—95)

The present invention relates to power monitors and measuring systems for use at microwave frequencies, and is especially concerned with such power measuring systems for direct indication of microwave power.

In the field of microwaves, the problems incident to the special characteristics of microwave power flow and the importance of avoidance of standing waves or reflections from discontinuities in the microwave conductor system have impelled the use of bolometers or power-sensitive resistors for use in measuring microwave power. However, heretofore such bolometer systems have required elaborate circuits and structures for permitting reading of the variation in resistance of the bolometer element in response to microwave power.

The present invention is concerned with improvements in such bolometer microwave power measuring equipment in which the variation in resistance of the bolometer element in response to the power being measured is converted into a variable amplitude local oscillation of audio frequency, which is directly utilized to actuate a direct-reading instrument or meter which may be calibrated directly in microwave power.

According to an improved feature of the present invention, temperature-compensating means are provided for minimizing any tendency for the calibration of the system to vary in response to variations in operating or ambient temperature.

Other objects and advantages of the present invention will be found more apparent from consideration of the following specification and the appended drawings, in which:

Figure 1 is a schematic circuit diagram of the microwave power measuring system of the present invention;

Figure 1A is a graph useful in explaining the operation of the system of Fig. 1;

Figure 2 is a longitudinal cross-sectional view of one embodiment of the physical structure of the power monitor head;

Figure 3 is an end view of the device of Figure 2.

Figure 4 is a longitudinal cross-sectional view of another physical embodiment of the monitor head; and Figure 5 is a perspective view of one element of Figure 4.

Figure 1 shows the schematic circuit diagram for the measuring system. Two bolometer elements 21 and 22 are indicated as having their junction 23 supplied with microwave power to be measured from the coaxial line 53 through the D.C. and audio blocking condenser 54. The structure of this arrangement is described below. The outer terminal of bolometer 22 is grounded as at 56 and the outer terminal of bolometer 21 is grounded for microwaves but isolated from ground for audio frequencies by condenser 57. The bolometers 21 and 22, in series connection, form part of the bridge circuit 58 having a fixed resistive arm 59, a temperature-compensating arm formed by resistors 61, 62, and a calibrating or setting arm 63 having a fixed resistor 64 shunted by a pair of variable resistor networks 66a, 66b, and 67a, 67b, 67c, respectively. Terminal 68 of the bridge 58, which is opposite to the grounded terminal 56, is coupled directly, as by a shielded cable 70, to the control grid of an amplifier tube 71, illustrated as being a pentode, although any grid-controlled tube may be used. This tube 71 is provided with an input resistor 72. Its cathode is coupled to ground through a self-biasing resistor 73 and by-pass condenser 74. Its screen grid is supplied from a positive potential source 76 through a resistor 77, and is grounded for alternating currents by a by-pass condenser 78. The anode of tube 71 is coupled to the positive source 76 through a tuned circuit 79 which, as will be seen, determines the frequency of operation. This tuned circuit is resonant at a suitable audio frequency such as 1000 cycles per second. The anode of tube 71 is also coupled through a blocking condenser 81 and input resistor 82 to the control grid of a second amplifier tube 83 whose cathode is grounded through a resistor 84. Tube 83 may also be any type of grid-controlled tube. The screen grid of tube 83 is supplied with positive potential from source 76 through resistor 85 and is by-passed to ground for alternating currents by a condenser 86. The anode of tube 83 is coupled to the source 76 through the primary winding 87 of an audio transformer 88 having two secondary windings 89 and 90. The secondary winding 90 is connected to the diagonal 91, 92 of bridge 58.

It will thus be seen that the tubes 71 and 83 form an amplifying system and feed back is provided between the output of tube 83 and the input of tube 71 through the bridge 58. The amplifiers 71 and 83 have a fixed gain. Hence an oscillator of this type is only stable for a specific degree of feedback, for which the ratio of output to input is equal to the gain, so that the system oscillates at the audio frequency of the parallel resonant circuit 79. If the bridge 58 were exactly in balance, it will be obvious that the signal at terminal 68 would be zero, and there would be no feedback to permit oscillation. Consequently bridge 58 is operated slightly off balance; for example, resistors 59, 21—22 and 61—62 are selected to be substantially the same in the absence of input microwave power, and the resistance of arm 63 may be adjusted by variable resistors 66a, 67b or 67c to provide the desired amplitude of no-signal oscillation. Preferably resistance of arm 63 is slightly less than that of the other arms of bridge 58. For this, resistor 64 may be the same as resistor 59, or may have slightly higher resistance. The shunt networks 66a, 66b and 67a, 67b, 67c then provide a ready means for adjusting the net resistance of arm 63 to the desired value. Resistors 66a, 66b may have a total resistance of the order of ten times that of 64, while 67a, 67b and 67c may have a resistance of the order of thirty to fifty times that of 64. For example, for 64=200 ohms, 66a may be of the order of 1500 ohms, 66b about 500 ohms, 67a about 5000 ohms, 67b 1000 ohms, and 67c 100 ohms, whereby 66a is a coarse balance control, and 67b and 67c serve as fine or zero-set controls.

When microwave power is supplied to the bolometer elements 21 and 22, which are connected in parallel so far as microwave power is concerned, their resistances increase, changing the condition of balance of the bridge. Since bridge arm 63 is of lesser resistance than arm 59, an increase in the resistance of arm 21—22 over arm 61—62 tends to restore the bridge toward balance. This in turn reduces the amount of feedback appearing at the input of tube 71, resulting in a lower output from tube 83 and a consequent decrease in the audio excitation of bridge 58 from winding 90. This reduced excitation then decreases the resistance of the bolometer elements 21, 22. This process thus changes the amplitude of oscillations of the oscillator system until the resistances of the elements 21, 22 return to their original values, at which the oscillator system is again stable. As a result, the audio power supplied to the bolometer elements is automatically reduced by exactly the amount of the added microwave power, since the total power dissipated in the bolometer elements remains unchanged. This decrease in audio power is then indicated to provide the desired indication of microwave power amplitude.

In the indicator circuit, the second secondary winding 89 of transformer 88 is connected through a condenser 93 to a rectifier 94. A D.C. meter 96 is coupled across the rectifier 94 selectively through a variable resistor 97 or a variable resistor 98 by means of a switch 99, thereby permitting changing of the scale of the meter 96, as described below. At the same time a source of positive potential 101, which may be derived from source 76, is supplied in opposition to the rectified output of rectifier 94, through a large resistor 100, so that adjustment of 97 or 98, or switching between 97 and 98, has substantially no effect on the current through meter 96 from source 101, which may thus be considered as a constant current source.

The functioning and calibration of the indicator will be more readily understood from the following analysis, ignoring for the moment the effect of source 101. Let $P_m$ be the microwave power to be measured, $P_a$ the audio power supplied to the bolometer elements from the oscillator, R the bolometer resistance, $V_a$ the audio voltage appearing across winding 90 and $KV_a$ that across winding 89, K being a factor of proportionality. The meter 96 indicates the value $KV_a$. Then, at no-signal condition, $$P_{m0}=0 \text{ and } P_{a0}=\frac{V_a^2}{R} \text{ or } V_a=\sqrt{P_{a0}R}$$

where the subscript "0" designates the no-signal condition. For this situation, meter 96 should read zero. This can be arranged by providing an ordinary meter whose calibration is backwards; i.e., scale zero is at the right end, although the rest or unexcited position of the meter pointer is at the left end as usual. Then, as microwave power $P_m$ is added, the audio power $P_a$ must diminish to maintain constant bolometer resistance, requiring constant total power. This reduces $V_a$ and $KV_a$ which is indicated by the meter. For maximum $P_m$, $V_a$ is zero, and the meter is unexcited. Hence all readings would be backwards.

In another form, the meter 96 may be specially arranged so that the pointer rests at the right scale end when unexcited, and moves leftward as excitation is increased. In this case the microwave power scale will read forward, zero power reading being at the left end and maximum power reading being at the right end, as in conventional practice.

To avoid use of a special meter, and still obtain forward reading, a direct current bias is applied to an ordinary left zero meter 96 from constant current source 101. This bias urges the pointer to the right, i.e., is positive. The rectified audio voltage $V_a$ is applied to meter 96 with a negative polarity, and urges the pointer to the left. When zero microwave power is being measured $V_a$ is maximum and the pointer is at the left end, which is the power scale zero. As the microwave power $P_m$ increases, $V_a$ decreases, and the pointer moves to the right. The maximum power reading is for $V_a=0$, for which the scale reading is the pointer position due only to the bias; this may be the extreme right pointer position when the bias equals the effect of the zero-signal audio voltage.

However, in all these cases a compressed scale effect is present. This is readily shown as follows. Assuming that zero microwave power produces one extreme scale reading, and maximum power produces the opposite extreme reading. For half-scale reading, the audio voltage must then be half its maximum. Thus the audio power in the bridge, being proportional to the square of the voltage, is one-quarter maximum, and the microwave power is three-quarters maximum. Hence, three-quarters of the microwave power range is in the lower half of the scale, and only one-quarter in the upper half of the scale, indicating the degree of scale compression.

The present invention provides an improved way of minimizing this scale compression while also including a simple way of providing for changing the range of measurement.

If the direct current bias is doubled in magnitude over that described above, accompanied by a doubled value of zero-signal audio voltage, the zero-power scale reading remains unchanged. At half of the maximum audio voltage, the pointer will rest at the right end of the scale which will be a reading of three-quarters of the maximum microwave power. Thus, by this arrangement, the upper quarter of the power measuring range is suppressed, being off-scale, but the advantage is gained that the remaining three-quarters of the range is spread over the full scale, and is more nearly uniform. There is no disadvantage as to maximum available power, since the range of meter 96 can be readily selected so that desired full scale microwave power reading is obtained. This is done by proper selection or adjustment or resistor 97 or 98. It will be seen that, with meter 96 being a milliammeter or microammeter, the resistor 97 or 98 in series with it converts it into a volt-meter which can respond proportionately to the rectified audio voltage. The magnitude of resistor 97 or 98 determines the audio voltage at which full scale reading is obtained. This in turn determines the microwave power reading as indicated above, and hence the full scale power reading can be calibrated by adjusting resistor 97 and 98. By switching from one to the other, where they are of markedly different value, the range of power measurement can be switched, and a multi-range instrument is provided. For example, resistor 97 may be approximately 100,000 ohms with a 0-100 mircoammeter, to provide a power range of 0-20 milliwatts. By making resistor 98 about 250,000 ohms, the range becomes 0-100 milliwatts. In each case, resistor 100 is considerably larger so that the bias current remains unchanged.

The present invention also provides an improved way of avoiding the harmful effects of temperature variation. Since the bolometer elements 21 and 22 are essentially temperature responsive, being power responsive to the extent that dissipated power modifies their temperature and hence their resistance, it will be apparent that these elements will also be sensitive to changes in ambient or operating temperature, which is an undesired effect. The resistors 61 and 62 are provided to overcome such temperature sensitivity. The bolometers 21 and 22 are known to have an essentially linear temperature characteristic. However, this characteristic will have a different slope or temperature sensitivity from bolometer element to bolometer element, due to unavoidable variations encountered in production. Accordingly it is necessary to provide compensating resistor elements which can be readily adjusted or selected to compensate for any set of bolometer elements which may be encountered. This is done according to the present invention by providing two compensating resistors 61 and 62 in series. These resistors 61 and 62 are formed of different materials, one having a temperature coefficient lower than that of the bolometer elements, and the other having a temperature coefficient higher than that of the bolometer element. This is indicated in Figure 1A, where a representative characteristic of the bolometers 21 and 22 is shown by curve A. Resistor 61 may then have a characteristic curve B and resistor 62 a characteristic curve C. Then, by choosing values of resistance for the resistors 61 and 62, such that their total is equal to the total zero-signal resistance of the series-connected bolometer elements 21 and 22, with proper proportioning of the resistance of 61 relative to that of 62, any linear characteristic between B and C may be derived. For example, if the resistance 61 is equal to that of the series-connected bolometer elements and that of 62 is zero, characteristic C will be derived. If the resistance of 62 is equal to that of the bolometer elements and that of 61 is zero, characteristic B will be derived. If resistors 61 and 62 are of equal resistance, each equal to half of the bolometer resistance, then a central characteristic such as shown by the dotted line D would be derived. By proportioning the values of resistances 61 and 62 while maintaining their total equal to that of the bolometer elements, any desired characteristic between B and C can be derived, such as characteristic A.

The manner in which such proportioning may be obtained will be seen from the following analysis. Let R be the total desired resistance of bolometers 21 and 22, and $R_1$ and $R_2$ be their respective resistances at any temperature $t$. If their respective temperature coefficients are $K_1$ and $K_2$, then $$R_1 = R_{01}(1+K_1 t)$$
$$R_2 = R_{02}(1+K_2 t)$$

Where $R_{01}$ and $R_{02}$ are their respective resistances at $t=0$. Also, $$R = R_1 + R_2$$
$$= (R_{01} + R_{02})\left(1 + \frac{K_1 R_{01} + K_2 R_{02}}{R_{01} + R_{02}} t\right)$$

If the net desired resistance characteristic is given by $$R = R_0(1+Kt)$$

then $$R_0 = R_{01} + R_{02} \quad (1)$$

and $$K = \frac{K_1 R_{01} + K_2 R_{02}}{R_{01} + R_{02}} \quad (2)$$

From Equations 1 and 2, for any desired $R_0$ and $K$, and given $K_1$ and $K_2$ by virtue of the materials selected, it is possible to determine $R_{01}$ and $R_{02}$ to yield the desired temperature characteristic.

For convenience of design and temperature compensation, one resistor may be chosen to have a temperature coefficient of substantially zero, a suitable material being cupron. The other may then be of some substantial temperature coefficient, such as nickel. Then $K_2=0$ and Equation 2 simplifies to $$K = \frac{K_1 R_{01}}{R_0} \quad (2A)$$

In this manner any change in ambient temperature is automatically compensated for, and will not effect the balance or unbalance of the bridge. While, as illustrative of materials useful for present purposes nickel and cupron have been mentioned, it will be understood that any other resistive materials having these relative temperature characteristics B and C may be utilized. Preferably one resistor, such as 61, is variable or carefully calibrated for final adjustment of temperature characteristic.

Accordingly, the present invention has provided an extremely simple useful direct reading power measuring system for microwave power requiring no elaborate settings for each reading and which is temperature stable over the entire operating range.

Figures 2 and 3 show the construction of the power monitor head comprising the bolometers 21 and 22 and the temperature-compensating resistor 61. This head is formed by a housing 12, which may be a casting or machined piece of conductive material such as brass, having a longitudinal bore 13 extending therethrough, with an enlarged portion 16 at the left end and also having transverse bores 15 in which, as will be seen, is mounted the pair of bolometer elements 21 and 22. Mounted within the bore 13 is an insulating bead 18 which supports the female contact 19 having a bore 20 at the left end thereof for accommodating the center male contact of the connecting coaxial line. The contact 19 is provided with spring fingers 23 for making good electrical contact with the connecting male contact, and is formed at its right end by a cylindrical extension 24 joined to the contacting portion 23 by a flange 25 serving both to retain the bead 18 in place and to provide an impedance match to overcome the effect of the line discontinuity formed by bead 18, which is also undercut at its ends for impedance matching. At the right end the inner conductor 24 has a bore 26 for receiving an insert 27, to be described.

The outer end 11 of the left end of housing 12 is threaded to receive the coupling nut of a connecting coaxial line, and a bushing 17 is inserted within the enlarged bore 16 of the housing 12 to form a contact and seat for the outer conductor of the connecting coaxial line.

The bolometer elements 21 and 22 are formed as metalized coatings of a suitable noble element alloy upon a glass or other insulating rod base, and are provided with conductive end or terminal coatings such as 21a and 22a, which may be tinned for ready soldering. Such resistors are available from Telewave Laboratories, Inc. of Brooklyn, N.Y. The terminals 21a and 22a of the respective bolometers 21 and 22 are juxtaposed at the axis of the bore 13 of housing 12 and extend symmetrically and oppositely in the bores 15. These bores 15 contain insulating linings 29, 29a, within which are mounted respective cylindrical microwave chokes 31, 31a of well known design acting to prevent leakage of microwave energy in the direction along the axis of bolometer elements and low R.F. impedance from bolometers 21 and 22 to ground. The linings 29, 29a serve to prevent a direct-current or audio-frequency short circuit for the bolometer elements. These bolometer elements are then connected to respective wires 32, 32a, passing through the centers of respective radial capacitors 33, 33a, which serve as a further by-pass for any high-frequency currents. Such capacitors are available from Sangamo Electric Company. The insulating spacers 34, 34a and capacitors 33, 33a serve to retain the wires 32, 32a and bolometers 21, 22 in spacers of the bore 1g. The wires 32, 32a are coupled to respective terminals 36, 36a which serve to couple the bolometer elements in the circuit of Figure 1, these terminals being shown as 56 and 91 in Figure 1.

To join the bolometer elements to the coaxial line arrangement 24, 12, the insert 27 is provided which has a reduced diameter portion surrounded by a thin insulating film and seated within the bore 26, thereby capacitively coupling the insert 27 to the inner conductor 24. This insulating film thereby forms capacitance 54 shown in Figure 1, isolating the monitor head from the coaxial line except for microwave energy. The right end of the insert 27 is bifurcated in a manner similar to that shown in Figure 5 at 38, and accordingly partially surrounds the terminal portions 21a, 22a of the bolometer elements 21, 22 and is soldered thereto, access for a soldering being provided by the open right end of bore 13 when the holder 41 is removed.

The holder 41 is joined to the housing 12 by means of suitable fasteners such as screws 42, and supports the compensator assembly 43 containing the nickel (or non-zero-coefficient) compensating resistor 62 which desirably is maintained at the same temperature condition as the bolometer elements 21 and 22. For this purpose the compensator resistor 62 is wound in non-inductive fashion on a suitable cylindrical support 44 preferably of heat-conductive insulating material, and secured to resistor holder 47. The terminal 44 then provides coupling to the compensator resistor 62 whose other terminal is grounded to the housing 12. A cover 46 may also be supplied where desired.

In this manner, microwave power from a coaxial line coupled to the left end of the power monitor head of Figure 2 is supplied capacitively across the insulation between insert 27 and inner conductor 26, to the junction of bolometers 21 and 22. This microwave power then divides along the parallel paths to ground afforded by bolometers 21 and 22 and their capacitive couplings 33 and 33a to ground. In addition, the terminal 36a may also be directly grounded for audio frequencies or direct current, as indicated at 56 in Figure 1. With respect to audio frequencies or direct currents, however, the two bolometer elements 21, 22 are in series between terminals 36 and 36a and these two series-connected elements then form one arm of the bridge 58 of Figure 1.

The holder 41 and the housing 12 are made relatively massive to provide good heat conductivity to maintain the compensating resistor 62 at the same temperature condition as the bolometers. The compensating resistor holder 47 may be threadedly engaged into the holder 41 so as to permit easy change of compensating resistor should that be required upon substitution of different bolometer elements.

Figures 4 and 5 show slightly modified form of structure for the power monitor head. In this form the housing 120 has a groove 121 extending annularly around one end in which is seated a spring washer 122 which rotatably retains the coupling nut 123 for the connecting coaxial line. The inner conductor 124 is supported as before by an insulating bead 126 and the outer conductor coupling 127 is suitably secured to the housing 120 as by insulating spacer 119. The coupling insert 128 has a reduced extension 129 fitting within the bore 130 at the right end of the inner conductor segment 124 and insulated therefrom by an insulating lining 131. The insert 121, as shown in Figure 5, has a plurality of slits 132 for the purpose of making it highly flexible to adjust to the desired position where necessary. It has a forked end 38 which surrounds the terminals 21a, 22a of the resistors 21 and 22 and is soldered thereto. The bolometer resistor 21 is mounted in the same manner as in Figure 3. Resistor 22, however, has its second terminal 22b seated within an opening in the housing 120 and is directly connected thereto, as by soldering or pressed fit, thereby eliminating the necessity of the terminal 36a, the condenser 33a and their associated structure, since in the circuit shown one end of resistor 22 is directly grounded at 56, the housing 120 being also grounded.

The temperature compensating resistor 61 and its housing 43 are as in Figure 3. In addition, a terminal board 141 is provided upon which are mounted the fixed calibrating resistor 64 and the other (cupron) compensating resistor 61, each preferably non-inductively wound and connected to the terminals 142 to which a suitable cable entering the head cover 143 at the opening 144 may be coupled.

The structure of the choke joint of Figure 3 is shown in larger detail in Figure 4. The lead 32 is connected to a conductive rod 35 which is separated from the housing 120 by a flat insulating washer 40 providing a capacitive by-pass in addition to the condenser 33. The terminal strip 141 may be secured to the housing 120 in any suitable manner as by a screw 151.

In this manner, there has been provided both an improved structure and an improved circuit for microwave power monitors or the like, effecting the objects and advantages already described.

It is to be understood that the above description is to be taken as illustrative only, since many equivalent forms are readily devisable without departing from the scope of the invention, which is defined solely by the appended claims.

What is claimed is:

1. Microwave power measuring apparatus comprising a conductive casing having a longitudinal bore therethrough, an insulating bead positioned within said bore and having an axial aperture, an inner conductor segment supported within said bead aperture, a coaxial line coupling formed on the outer end of said inner conductor segment and on the outer end of said casing bore adjacent thereto, said casing also having a transverse bore, a pair of microwave-sensitive resistor elements positioned axially along said transverse bore in end-to-end relationship and having their junction substantially along the axis of said longitudinal bore, a coupling insert connected to said resistors at said junction and extended axially along said longitudinal bore and joined to said inner conductor segment to form a substantial continuation thereof, an insulating separation between said coupling insert and said inner conductor segment forming a microwave-conductive capacitive coupling between said segment and insert, a microwave choke coupling the outer end of each of said resistors to said casing in microwave fashion but insulating said outer end from said casing for direct current or audio frequency energy, a radial type capacitor mounted in said casing coaxially with said transverse bore, a lead extending from said resistor and through said capacitor and connected to the inner terminal of said capacitor, a heat-conductive insulating core secured to said casing in heat transfer relationship thereto, a temperature-compensating resistor coil wound on said core, whereby said resistor coil is subjected to substantially the same ambient temperature as said microwave resistors, said longitudinal bore having an internally threaded portion at the end of said longitudinal bore opposite said coupling, said compensating resistor core having an externally threaded extension removably engaging said casing threaded bore and a lead coupled to one end of said compensating resistor, the other end being coupled to said casing.

2. Microwave power-measuring apparatus as claimed in claim 1 wherein said pair of microwave sensitive resistor elements comprise rods of non-conductive material having a coating of conductive material with a relatively high temperature coefficient of resistance.

3. Microwave power measuring apparatus comprising a conductive casing having a longitudinal bore therethrough, an inner conductor segment supported within said bore, a coaxial line coupling formed on the outer end of said inner conductor segment and on the outer end of said casing bore adjacent thereto, said casing also having a transverse bore, a pair of microwave-sensitive resistor elements positioned axially along said transverse bore in end-to-end relationship and having their junction substantially along the axis of said longitudinal bore, a coupling insert connected to said resistors at said junction and extended axially along said longitudinal bore and joined to said inner conductor segment to form a substantial continuation thereof, an insulating separation between said coupling insert and said inner conductor segment forming a microwave-conductive capacitive coupling between said segment and insert, a microwave choke coupling the outer end of each of said resistors to said casing in microwave fashion but insulating said outer end from said casing for direct current or audio frequency energy, a radial type capacitor mounted in said casing coaxially with said transverse bore, a lead extending from said resistor and through said capacitor and connected to the inner terminal of said capacitor, a heat-conductive insulating core secured to said casing in heat transfer relationship thereto, a temperature-compensating resistor coil wound on said core, whereby said resistor coil is subjected to substantially the same ambient temperature as said microwave resistors, said longitudinal bore having an internally threaded portion at the end of said longitudinal bore opposite said coupling, said compensating resistor core having an externally threaded extension removably engaging said casing threaded bore and a lead coupled to one end of said compensating resistor, the other end being coupled to said casing.

4. Microwave power measuring apparatus comprising a conductive casing having a longitudinal bore therethrough, an insulating bead positioned within said bore and having an axial aperture, an inner conductor segment supported within said bead aperture, a coaxial line coupling formed on the outer end of said inner conductor segment and on the outer end of said casing bore adjacent thereto, said casing also having a transverse bore, a pair of microwave-sensitive resistor elements positioned axially along said transverse bore in end-to-end relationship and having their junction substantially along the axis of said longitudinal bore, a coupling insert connected to said resistors at said junction and extended axially along said longitudinal bore and joined to said inner conductor segment to form a substantial continuation thereof, an insulating separation between said coupling insert and said inner conductor segment forming a microwave-conductive capacitive coupling between said segment and insert, a microwave choking coupling the outer end of one of said resistors to said casing in a microwave fashion but insulating said outer end from said casing for direct current or audio frequency energy, a heat-conductive insulating core secured to said casing in heat transfer relationship thereto, a temperature-compensating resistor coil wound on said core, whereby said resistor coil is subjected to substantially the same ambient temperature as said microwave resistors, said longitudinal bore having an internally threaded portion at the end of said longitudinal bore opposite said coupling, said compensating resistor core having an externally threaded extension removably engaging said casing threaded bore and a lead coupled to one end of said compensating resistor, the other end being coupled to said casing.

5. Microwave power measuring apparatus comprising a conductive casing having a longitudinal bore therethrough, an inner conductor segment supported within said bore, a coaxial line coupling formed on the outer end of said inner conductor segment and on the outer end of said casing bore adjacent thereto, said casing also having a transverse bore, a pair of microwave-sensitive resistor elements positioned axially along said transverse bore in end-to-end relationship and having their junction substantially along the axis of said longitudinal bore, a coupling insert connected to said resistors at said junction and extended axially along said longitudinal bore and joined to said inner conductor segment to form a substantial continuation thereof, an insulating separation between said coupling insert and said inner conductor segment forming a microwave-conductive capacitive coupling between said segment and insert, a microwave choke coupling the outer end of one of said resistors to said casing in microwave fashion but insulating said outer end from said casing for direct current or audio frequency energy, a heat-conductive insulating core secured to said casing in heat transfer relationship thereto, a temperature-compensating resistor coil wound on said core, whereby said resistor coil is subjected to substantially the same ambient temperature as said microwave resistors, and a lead coupled to one end of said compensating resistor, the other end of said resistor being coupled to said casing.

References Cited in the file of this patent

UNITED STATES PATENTS

| | | |
|---|---|---|
| 2,351,895 | Allerding | June 20, 1944 |
| 2,437,449 | Ames et al. | Mar. 9, 1948 |
| 2,449,072 | Houghton | Sept. 14, 1948 |
| 2,468,688 | Schmitt | Apr. 26, 1949 |
| 2,495,268 | Leiphart | Jan. 24, 1950 |
| 2,590,477 | Weber et al. | Mar. 25, 1952 |
| 2,619,540 | Lundstrom | Nov. 25, 1952 |
| 2,700,749 | Bird | Jan. 25, 1955 |

FOREIGN PATENTS

| | | |
|---|---|---|
| 694,933 | Germany | Aug. 12, 1940 |
| 605,734 | Great Britain | July 29, 1948 |

UNITED STATES PATENT OFFICE
CERTIFICATE OF CORRECTION

Patent No. 2,887,655

May 19, 1959

D. Lawrence Jaffe

It is hereby certified that error appears in the printed specification of the above numbered patent requiring correction and that the said Letters Patent should read as corrected below.

Column 6, line 44, for "bore 1g" read -- bore 15 --; lines 58 and 59, after "soldering" insert -- iron --; column 9, line 19, for "choking" read -- choke --.

Signed and sealed this 29th day of September 1959.

(SEAL)
Attest:

KARL H. AXLINE
Attesting Officer

ROBERT C. WATSON
Commissioner of Patents